United States Patent [19]

Dieudonne

[11] 4,218,588
[45] Aug. 19, 1980

[54] DIGITAL SIGNAL SWITCHING SYSTEM

[75] Inventor: Marc P. G. Dieudonne, Igny, France

[73] Assignee: Le Materiel Telephonique, Boulogne-Billancourt, France

[21] Appl. No.: 946,078

[22] Filed: Sep. 27, 1978

[30] Foreign Application Priority Data

Sep. 30, 1977 [FR] France .............................. 77 29440

[51] Int. Cl.² ........................................... H04Q 11/04
[52] U.S. Cl. ................................................... 370/59
[58] Field of Search ........ 179/15 AT, 18 GF, 18 FC, 179/15 AQ

[56] References Cited

U.S. PATENT DOCUMENTS

| | | | |
|---|---|---|---|
| 3,236,951 | 2/1966 | Yamamoto | 179/15 AQ |
| 3,751,597 | 8/1973 | Bonyhard | 179/15 AQ |
| 3,956,593 | 5/1976 | Collins | 179/15 AQ |
| 4,045,617 | 8/1977 | Schlichte | 179/15 AT |
| 4,074,077 | 2/1978 | Charranson | 179/15 AT |

*Primary Examiner*—David L. Stewart
*Attorney, Agent, or Firm*—Roland Plottel

[57] ABSTRACT

This invention relates to a switching system for time-division multiplexed PCM channels. The system possesses essentially an incoming time-division switching device, a space-division switching device and an outgoing time-division switching device. The invention proposes to produce these time-division switching devices in the form of memories organized in pages enabling them to be manufactured in the form of hybrid monolithic integrated circuits. Application: time-division telephone switching.

2 Claims, 5 Drawing Figures

DIGITAL SIGNAL SWITCHING SYSTEM

BACKGROUND OF THE INVENTION (a) Field of the Invention

The present invention relates to a system for switching digital signals arranged in frames. More particularly, the present invention relates to a system which possesses two types of access: a first type of access for the connection of incoming, serial, digital signal interfaces, and a second type for the connection of outgoing, parallel, digital signal interfaces. The system comprises a switching network including at least one time-division digital sample switching device having a memory, a read addressing circuit and a write addressing circuit, and a read/write control circuit, the system being further provided with a control unit for controlling the switching operations to be performed inside the switching network and which is in communication with one of the addressing circuits. These switching systems are more particularly used as telephone exchanges.

(b) Discussion of the Prior Art

An exchange of the above type is described in an article by P. VOYER, K. KEVORKIAN and J. P. LAGER entitled "Reseau de Connection Pour Grands Centres Temporels" (Connection Network for Large Time-Division Exchanges) published in number 49 dated April 1975 of the "COMMUTATION ET ELECTRONIQUE" (Switching and Electronics) review produced by SOCOTEL.

SUMMARY OF THE INVENTION

Time-division exchanges are required to be connected to an ever-increasing number of lines and to handle ever-increasing traffic loads. For this reason, exchanges may become very large.

The present invention proposes a telephone exchange for digital signals in which the time-division switching devices possess structures such that they can be produced with very small dimensions or manufactured using hybrid integrated-circuit techniques.

For this purpose, a telephone exchange of the type mentioned in the introduction is characterized by the fact that the time-division switching device possesses a memory organized in "q" pages of n-bit words, a plurality of first terminals, a plurality of second terminals, "q" switching circuits and "q" bit selectors.

One advantage of the instant invention is that the serial-to-parallel and parallel-to-serial conversions are performed without the use of additional components. This is important for exchanges in which the interfaces transmit the speech samples in serial form and where it is preferable to place the samples in parallel form for the purpose of time-division switching.

The following description accompanied by the appended drawings, the said description and drawings being given as a non-limiting example, clearly explain how the invention can be produced in practice. The drawings represent:

DETAILED DESCRIPTION OF THE INVENTION

Figure 1:
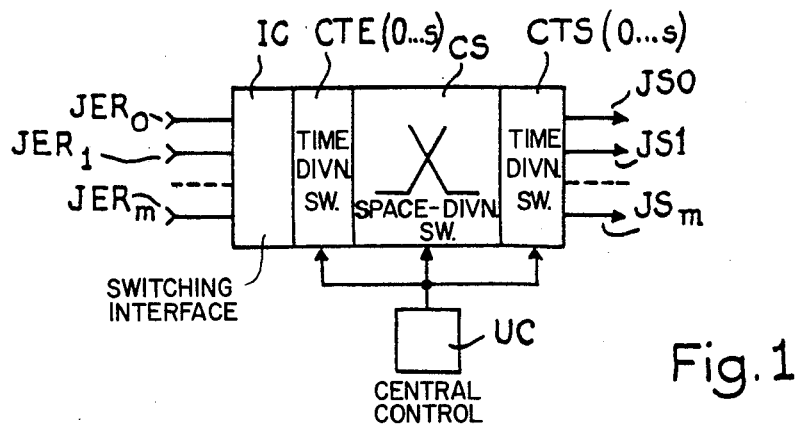
FIG. 1 depicts a telephone exchange in accordance with the invention.
Figure 2:
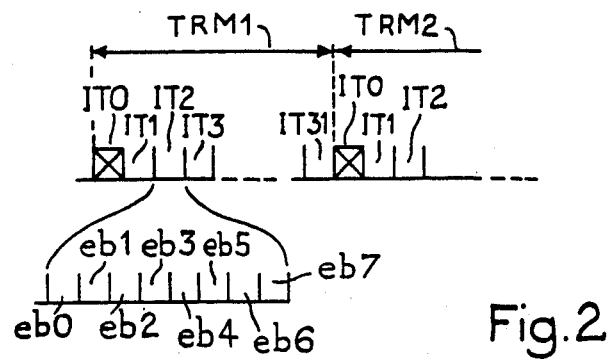
FIG. 2 depicts the organization of a PCM interface for the telephone exchange shown in FIG. 1.

The telephone exchange represented schematically in FIG. 1 is able to perform, by means of a switching network comprising a group of incoming time-division switching devices CTE (0 . . . S), a space-division switch CS and a group of outgoing time-division switching devices CTS (0 . . . S), various switching operations between telephone channels transmitted via the incoming interfaces JER0, JER1, . . . , JERm and the channels transmitted via the outgoing interfaces JS0, JS1, . . . , JSm. The interfaces involved are PCM interfaces. FIG. 2 shows how these various channels are constituted. In a given interface, different time slots IT-, TI1, IT2, IT3 . . . , IT31 are arranged in frames TRM1, TRM2 . . . , each time interval in successive frames constituting a channel. The channel constituted by all the time slots IT0 is known as channel V0, whilst that constituted by all the time slots IT1, is known as channel V1, etc. The above-described exchange possesses a switching interface IC, to the inputs of which are connected the incoming interfaces JER0, JER1, . . . , JERm. This switching interface resynchronizes the data obtained via the interfaces to the local clock. The exchange also possesses a group of incoming time-division switching devices CTE (0 . . . s), whose purpose is to shift in time the various digital samples transmitted via a channel. In the present example described, these digital samples consist of eight bits contained within a time slot (see FIG. 2).

In this exchange, a second time-division switching operation is performed on the samples by means of a group of outgoing time-division switching devices CTS (0 . . . s), to which are connected the outgoing interfaces JS0, JS1, . . . , JSm.

In order to allow the connection of any incoming interface channel to any outgoing interface channel, a space-division switch CS is provided. The various units CTE (0 . . . s), CTS (0 . . . s) and CS are controlled by a central control unit UC.

Figure 3:
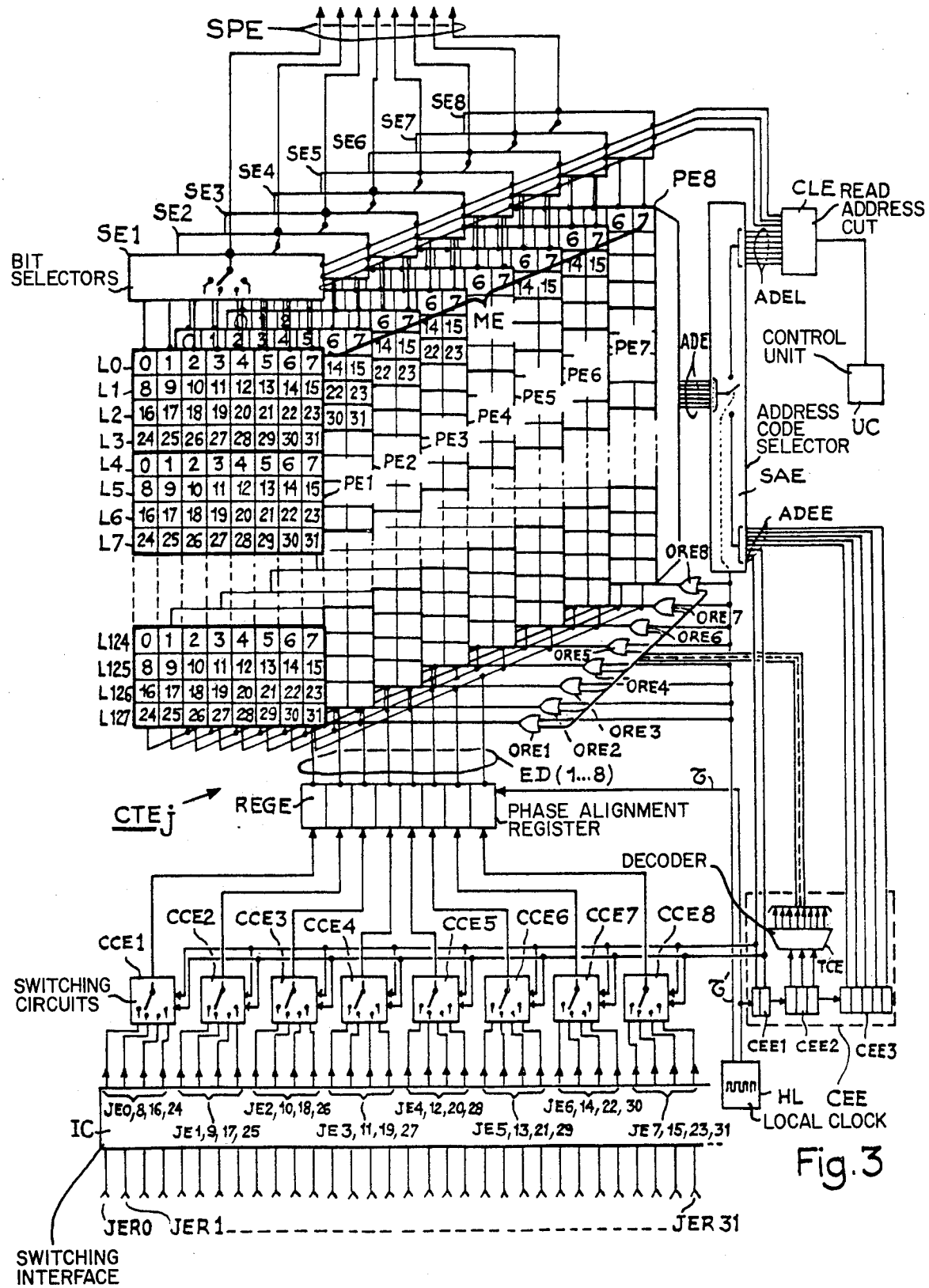
FIG. 3 depicts an incoming time-division switching device, forming part of the exchange illustrated in FIG. 1.
Figure 4:
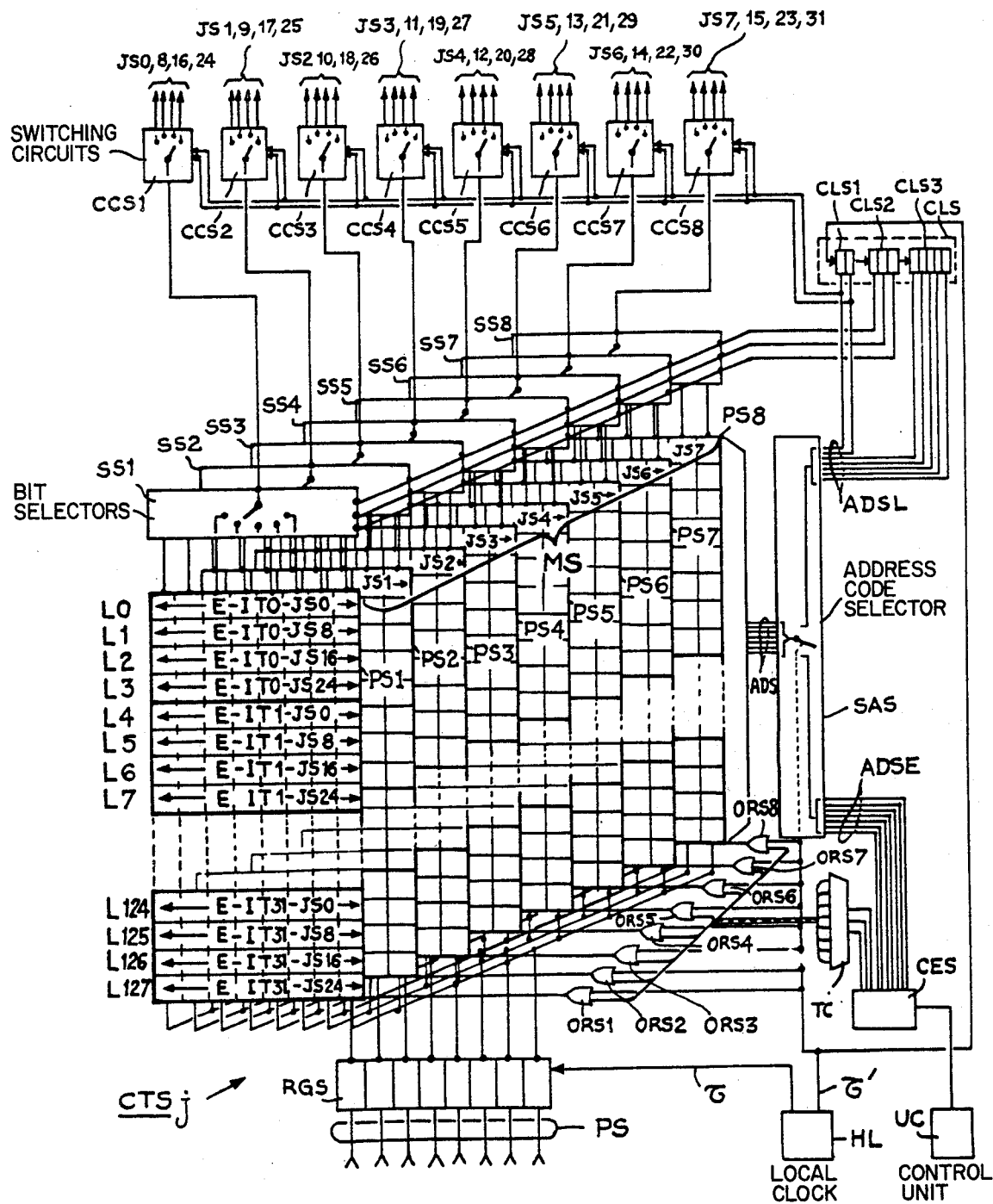
FIG. 4 depicts an outgoing time-division switching device, forming part of the exchange illustrated in FIG. 1.

The incoming and outgoing time-division switching devices CTE and CTS are shown in detail in FIGS. 3 and 4 and comprise a memory ME or MS, respectively, these memories having sufficient capacity to store an entire signal frame. The memories are addressed by a read addressing circuit CLE or CLS, and by a write circuit CEE or CES. The read addressing circuit CLE for device CTEj shown in FIG. 3 is connected to the control unit UC, and the write addressing circuit CES of device CTSj shown in FIG. 4 is also connected to the control unit UC.

In accordance with the invention, each of the incoming and outgoing time-division switching devices possesses a memory ME or MS organized in "q" pages. In the present example described, there are eight pages PE1, PE2, PE3, . . . , PE8 for memory ME and PS1, PS2, . . . , PS8 for memory MS. The serial signal terminals are connected for the incoming time-division switching device CTEj to the incoming interfaces JER0, ..., JER31 via the switching interface IC, and are connected for the outgoing time-division switching device CTSj to the outgoing interfaces JS0, ..., JS37. These devices CTEj and CTSj also possess terminals PE and PS for providing or receiving in parallel form samples corresponding to a time slot. Switching circuits CCE1, ..., CCE8 are provided for device CTEj. switching circuits CCS1, ... CCS8 are provided for device CTSj. bit selectors SE1, ..., SE8 are provided for device CTEj, and bit selectors SS1, ..., SS8 are provided for device CTSj. The inputs of these selectors are connected to the data outputs of the various pages. Each page has 128 lines, L0, ..., L127.

The description of the incoming time-division switching device CTEj will now be completed. The switching circuit inputs are connected to the resynchronized interfaces as follows: the four inputs of circuit CCE1 are connected to the resynchronized interfaces JE0, JE8, JE16 and JE24, the four inputs of circuit CCE2 to interfaces JE1, JE9, J17 and JE25, and so on, the four inputs of circuit CCE8 being connected to interfaces JE7, JE15, JE23 and JE31. The switching circuit outputs are connected to a phase-alignment register REGE possessing outputs ED1, ED2, ..., ED8, this phasing being obtained by means of a signal produced by the local clock HL available on a wire $\tau$. The various pages PE1, PE2, ..., PE8 possess a common addressing code input ADE which is connected to the output of an address code selector SAE. This selector possesses two inputs ADEL and ADEE. The address code for reading memory ME is applied to input ADEL, whilst the write address code is applied to input ADEE. The control input of selector SAE is connected to a wire $\tau'$ providing the connection to clock HL. Each of pages PE1 to PE8 possesses an enabling input connected to the outputs of gates ORE1, ORE2, ..., ORE8 respectively, each of these gates possessing two inputs. One of these inputs is connected to wire $\tau'$, whilst the other is connected to an output of the write addressing circuit CEE. To avoid encumbering the figure, the read/write order circuits for the various pages PE1 to PE8=are not shown. It should be understood that these control circuits are fed with the same signal, which is applied to the control input of the address code selector SAE. The write addressing circuit consists of three counters CEE1, CEE2 and CEE3 connected in cascade, i.e., the overflow outputs of counters CEE1 and CEE2 are connected to the inputs of counters CEE2 and CEE3. Counter CEE1 is a 2-state counter, counter CEE2 is a 3-state counter, whilst counter CEE3 is a 5-state counter. The outputs representing the state of counter CEE1 are connected to the write address code inputs of selector SAE and also to the control terminals of switching circuits CCE1 to CCE8. The outputs representing the state of counter CEE2 are connected to a decoder TCE which, for any code applied to its input, produces a logic signal on one and only one of its eight output wires. The outputs representing the state of counter CEE3 are connected to the write address code inputs of selector SAE.

Figure 5:
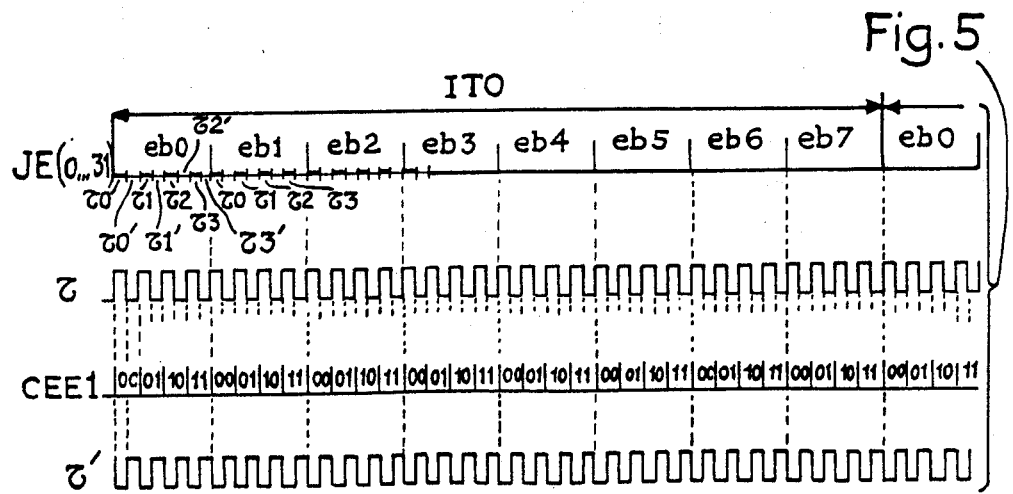
FIG. 5 is a diagram of the signals present in the incoming switching device illustrated in FIG. 3.

The operation of the incoming time-division switching device will now be explained with the aid of FIG. 5. The first line JE (0 ... 31) of this figure contains a succession of eight bits eb0, eb1, ..., eb7, belonging to time slot IT0. All the interfaces on the inputs of switching circuits CCE1 to CCE8 are synchronous. Each bit duration is divided into eight parts, the durations $\tau 0$, $\tau 1$, $\tau 2$ and $\tau 3$ being used for writing into memory, whilst durations $\tau 0'$, $\tau 1'$, $\tau 2'$ and $\tau 3'$ are for reading. The next line $\tau$ in FIG. 5 represents a clock signal whose frequency is eight times the bit rate. This signal is applied to the count input of counter CEE1, and is also applied to the input of register REGE. In this manner, the various data available at the various instants $\tau 0$, $\tau 1$, $\tau 2$ and $\tau 3$ are obtained on the output of register REGE. Line CEE1 in FIG. 5 shows the variation of the contents of counter CEE1. The next line $\tau'$ shows a signal which is the complement of that shown on line $\tau$. The following table illustrates the writing of data into memory ME.

TABLE I

Writing Into Memory ME

| Number of Time Slots | Write Intervals | ED1 | ED2 | ED3 | ED4 | ED5 | ED6 | ED7 | ED8 | CEE3 | CEE1 | Line Addressed | CEE2 | Page Selected |
|---|---|---|---|---|---|---|---|---|---|---|---|---|---|---|
| 1 | $\tau 0$ | eb0 ITO JE0 | eb0 ITO JE1 | eb0 ITO JE2 | eb0 ITO JE3 | eb0 ITO JE4 | eb0 ITO JE5 | eb0 ITO JE6 | eb0 ITO JE7 | 00000 | 00 | L0 | 000 | PE1 |
| 2 | $\tau 1$ | eb0 ITO JE8 | eb0 ITO JE9 | eb0 ITO JE10 | eb0 ITO JE11 | eb0 ITO JE12 | eb0 ITO JE13 | eb0 ITO JE14 | eb0 ITO JE15 | 00000 | 01 | L1 | 000 | PE1 |
| 3 | $\tau 2$ | eb0 ITO JE16 | eb0 ITO JE17 | eb0 ITO JE18 | eb0 ITO JE19 | eb0 ITO JE20 | eb0 ITO JE21 | eb0 ITO JE22 | eb0 ITO JE23 | 00000 | 10 | L2 | 000 | PE1 |
| 4 | $\tau 3$ | eb0 ITO JE24 | eb0 ITO JE25 | eb0 ITO JE26 | eb0 ITO JE27 | eb0 ITO JE28 | eb0 ITO JE29 | eb0 ITO JE30 | eb0 ITO JE31 | 00000 | 11 | L3 | 000 | PE1 |
| 5 | $\tau 0$ | eb1 ITO JE0 | eb1 ITO JE1 | eb1 ITO JE2 | eb1 ITO JE3 | eb1 ITO JE4 | eb1 ITO JE5 | eb1 ITO JE6 | eb1 ITO Je7 | 00000 | 00 | L0 | 001 | PE2 |
| 32 | $\tau 0$ | eb7 ITO JE24 | eb7 ITO JE25 | eb7 ITO JE26 | eb7 ITO JE27 | eb7 ITO JE28 | eb7 ITO JE29 | eb7 ITO JE30 | eb7 ITO JE31 | 00000 | 11 | L3 | 111 | PE8 |
| 33 | $\tau 0$ | eb0 IT1 JE0 | eb0 IT1 JE1 | eb0 IT1 JE2 | eb0 IT1 JE3 | eb0 IT1 JE4 | eb0 IT1 JE5 | eb0 IT1 JE6 | eb0 IT1 JE7 | 00001 | 00 | L4 | 000 | PE1 |
| 1024 | $\tau 3$ | eb7 IT31 JE24 eb0 | eb7 IT31 JE25 eb0 | eb7 IT31 JE26 eb0 | eb7 IT31 JE27 eb0 | eb7 IT31 JE28 eb0 | eb7 IT31 JE29 eb0 | eb7 IT31 JE30 eb0 | eb7 IT31 JE31 eb0 | 11111 | 11 | L127 | 111 | PE8 |

TABLE I-continued

Writing Into Memory ME

| Number of Time Slots | Write Intervals | ED1 | ED2 | ED3 | ED4 | ED5 | ED6 | ED7 | ED8 | CEE3 | CEE1 | Line Addressed | CEE2 | Page Selected |
|---|---|---|---|---|---|---|---|---|---|---|---|---|---|---|
| 1025 | τ0 | IT0 JE0 | IT0 JE1 | IT0 JE2 | IT0 JE3 | IT0 JE4 | IT0 JE5 | IT0 JE6 | IT0 JE7 | 00000 | 00 | L0 | 000 | PE1 |

The first instant of operation, all three write address counters CEE1, CEE2 and CEE3 are in the zero state. Switches CCE1, CCE2, ..., CCE8 are operated to provide connection between interfaces JE0, JE1, ..., JE7 connected to one of their inputs and their output. Register REGE then contains bits eb0 of time slots IT0 corresponding to interfaces JE0, JE1, ..., JE7. Since counters CEE1 and counter CEE3 are in the zero state, lines L0 of pages PE1 to PE8 are selected. Since counter CEE2 is also in the zero state, this implies by the action of decoder TCE that page PE1 is selected. At the first time interval of operation, line L0 therefore contains bits eb0 of interfaces JE0 to JE7. At the second time interval of operation, the state of counter CEE1 changes to "01", placing the switching circuits in a state such that a connection is provided between their second input and output. Bits eb0 of interfaces JE8 to JE15 are thus recorded in line L1 of page PE1. At the third time interval of operation, bits eb0 of interfaces JE16 to JE23 are recorded. At the fourth interval, the bits of interfaces JE24 to JE31 are in turn recorded. At the fifth interval, the state of counter CEE1 returns to "00". On the other hand, when this counter changes from state "11" to "00", counter CEE2 is incremented by 1, such that at this fifth interval page PE2 is selected in order to record bits eb1 of interfaces JE0 to JE7 in its line L0. Continuing this reasoning, it is seen that at the end of the 32nd interval, pages PE1 to PE7 contain in lines L0 to L3 respectively bits eb0 to eb7 of time slot IT0. At the 33rd interval, bits eb0 of time slot IT1 are recorded. At the 1024th interval, a complete frame of signals of the various interfaces JE0, ..., JE31 is recorded in memory ME. At the 1025th interval, recording of the next frame starts. On the line, the numbers in the page locations correspond to the interface number.

Memory ME is read at the various intervals τ0', τ1', τ2' and τ3' already defined. The read address codes appear on the output of the read addressing circuit CLE. When a read operation is being performed, the signal on wire τ' is "1" which, applied to one input of all the gates ORE1 to ORE7, validates all the pages. As already mentioned, the wires carrying the least significant bits of the read code on the output of the read addressing circuit CLE are connected to the control terminals of selectors SE1 to SE8. A sample is thus obtained in parallel form on the output of SPE, consisting of the various bits eb0 to eb8, each bit contained in one page PE1 to PE7, the line of each of these pages being selected by the code available on the other output wires of the read addressing circuit CLE.

The description of the outgoing time-division switching device CTSj shown in detail in FIG. 4 will now be completed. The inputs of switching circuits CCS1 to CCS8 are connected to the outputs of the bit selectors SS1 to SS8. Interfaces JS0, JS8, JS16 and JS24 are connected to the four outputs of switching circuit CCS1, interfaces JS1, JS9, JS17 and JS25 are connected to the four outputs of circuit CCS2, and so on, interfaces JS7, JS15, JS23 and JS31 being connected to the four outputs of switching circuit CCS8.

This device CTSj possesses an input PS for parallel digital samples. This input is connected to a register RGS for rephasing with the signals available on a wire connected to the output of clock HL. As for device CTEj, the various pages PS1, PS2, ..., PS8 possess inputs for the common addressing code ADS connected on the output of an address code selector SAS possessing two inputs ADSL and ADSE. The address code is applied to input ADSL for reading memory MS, whilst the write address code is applied to input ADSE. The control terminal of selector SAE and SAS is connected to the HL clock wire τ'. Each of pages PS1 to PS8 is provided with an enabling input connected to the outputs of gates ORS1 to ORS8 respectively, each gate possessing two inputs. One of these inputs is connected to wire τ', whilst the other is connected to the output of a write addressing circuit CES. The read/write order of the various pages PS1 to PS8 is the same signal applied to the control terminal of the address code selector SAS. The outputs of the addressing circuit CES are connected to inputs ADSE of the address code selector. The other outputs on which appear the least significant bits are connected to the inputs of a decoder TCS of the same type as decoder TCE illustrated in FIG. 3. The decoder outputs are connected to the remaining inputs of gates ORS1 to ORS8. The read addressing circuit CLS consists of three counters CLS1, CLS2 and CLS3 connected in cascade. The two outputs of counter CLS1 on which appear the least significant bits of the address code are connected to inputs ADSL of selector SAS and also to the control terminals of switching circuits CCS1 to CCS8. The three outputs representing the state of counter CLS2 are connected to the control terminals of the bits selectors SS1 to SS8. The five outputs of counter CLS3 are connected to input ADSL.

The operation of the outgoing switching device shown in FIG. 4 will now be explained. The identities of the various samples appearing on inputs PS are known by the control unit UC and data are sent by this unit such that the sample corresponding to time slot IT0 of interface JS0 is recorded in line L0 of page PS1, the sample corresponding to time slot IT0 of interface JS1 is recorded in line L0 of page PS2, and so on, up to the sample corresponding to time slot IT0 of interface JS7, which is recorded in line L0 of page PS8. The sample corresponding to time slot IT1 of interface JS0 is recorded in line L4 of page PS1, and so on, up to line L127 of page PS8, in which is recorded the sample corresponding to time slot IT31 of interface JS31. All these recordings are indicated in FIG. 4 for page PS1 on the line noted E-ITi-JSi. This should be interpreted as follows: a sample corresponding to time slot ITi of interface JSj.

The following Table II shows the process of reading memory MS. The read intervals are indicated by τ0', τ1', τ2' and τ3', as in FIG. 5.

At the first interval, all three counters CLS1, CLS2 and CLS3 are in the zero state. The lines addressed are therefore lines L0. The bit selectors SS1 to SS8 are controlled such that the data available on their outputs, i.e., bits eb0, are located, for example, on the left when viewing the figure.

Switching circuits CCS1, CCS2, ..., CCS8 are set such that the outgoing interfaces JS0 to JS7 are connected to the outputs of selector circuits SS1 to SS8. Counter CLS1 then increments by 1 at the second time interval, such that lines L1 of pages PS1 to PS8 are addressed. Bits eb0 of interfaces JS8 to JS15 are obtained on the outputs of selectors SS1 to SS8, circuits CCS1 to CCS8 being controlled such that interfaces JS8 to JS15 are connected to the selector outputs. At the third interval, lines L2 are addressed, such that bits eb0 are available on interfaces JS16, JS17, ..., JS23. At the end of the fourth time interval, all bits eb0 have been obtained on all the interfaces JS0 to JS31. At the fifth interval, counter CLS2 increments by 1, such that bits eb1 appear on the outputs of the bit selectors. The process continues in this manner until at the end of the 32nd time interval all the bits contained in time slot It0 have been obtained on all the interfaces.

TABLE II

| Number of Time Slots | Read Intervals | CLS3 | CLS1 | Line Addressed | CLS2 | Bit Selected | Interface Selected | Time Slot Concerned |
|---|---|---|---|---|---|---|---|---|
| 1 | τ0' | 00000 | 00 | L0 | 000 | eb 0 | JS0, JS1, ..., JS7 | IT0 |
| 2 | τ1' | 00000 | 01 | L1 | 000 | eb 0 | JS8, JS9, ..., JS15 | IT0 |
| 3 | τ2' | 00000 | 10 | L2 | 000 | eb 0 | JS16, JS17, ..., JS23 | IT0 |
| 4 | τ3' | 00000 | 11 | L3 | 000 | eb 0 | JS24, JS25, ..., JS31 | IT0 |
| 5 | τ0' | 00000 | 00 | L0 | 001 | eb 1 | JS0, JS1, ..., JS7 | IT0 |
| 32 | τ3' | 00000 | 11 | L3 | 111 | eb 7 | JS24, JS25, ..., JS31 | IT0 |
| 33 | τ0' | 00001 | 00 | L4 | 000 | eb 0 | JS0, JS1, ..., JS7 | IT1 |
| 1024 | τ3' | 11111 | 11 | L127 | 111 | eb 7 | JS24, JS25, ..., JS31 | IT31 |
| 1025 | τ0' | 00000 | 00 | L0 | 000 | eb 0 | JS0, JS1, ..., JS7 | IT0 |

Time slot IT1 is then considered at the 33rd time interval. By the end of the 1024th time interval, all bits eb0 to eb7 of time slots IT0 to IT31 have been read, and the procedure starts again at the 1025th time interval, as at the first interval.

Although the principles of the present invention are described above in relation with a specific practical example, it should be clearly understood that the said description is given as an example only and does not limit the scope of the invention.

I claim:

1. Apparatus for switching digital signals arranged in frames, said apparatus having a first access means for the connection of incoming serial digital signal interfaces thereto, a second access means for the connection of outgoing parallel digital signal interfaces thereto, and a switching network comprising at least one time division digital sample switching device including a memory, a read-address circuit, a write-address circuit, a read/write control circuit, and a control unit, connected to at least one of the address circuits, for controlling the switching operations of said switching network characterized by the fact that said time-division switching device further comprises:

a memory organized in "q" pages of n-bit words;

a plurality of first terminals, connected to said first access means, for the interconnection of said serial digital signals;

q switching circuits interconnecting said plurality of first terminals and said memory;

a plurality of second terminals for the interconnection of parallel data signals;

q bit-selector circuits interconnecting said plurality of second terminals and the page data outputs of said memory; and wherein said at least one time-division switching device is an incoming time-division switching device, the serial signal terminals thereof being connected to said first access means, characterized by:

means for connecting the outputs of said q switching circuits to the data inputs of the q pages of said memory;

means for connecting the outputs of said q bit-selector circuits to said plurality of second terminals, said write-address circuit comprising:

a first counter having a count signal input connected to the output of the local system clock and counter state outputs connected to the control terminals of said q switching circuits and also to the write-address code inputs of the various pages of said memory;

a second counter having a count signal input connected to the overflow output of said first counter, and a plurality of counter state outputs;

means, connected to said second counter, for producing a page-selection code from the plurality of counter state outputs from said second counter; and a third counter having a count signal input connected to the overflow output of said second counter, and counter state outputs connected to different write-address code inputs of the various pages than said first counter, said read-address circuit comprising:

means for connecting the least significant code output of said read-address circuit to the control terminals of said q bit-selector circuits; and means for connecting the most significant code output of said read-address circuit to the read-address code inputs of the various pages of said memory, said read/write control circuit producing a signal which enables all pages of the memory in the read mode.

2. Apparatus for switching digital signals arranged in frames, said apparatus having a first access means for the connection of incoming serial digital signal interfaces thereto, a second access means for the connection of outgoing parallel digital signal interfaces thereto, and a switching network comprising at least one time division digital sample switching device including a memory, a read-address circuit, a write-address circuit, a read/write control circuit, and a control unit, connected to at least one of the address circuits, for controlling the switching operations of said switching network characterized by the fact that said time-division switching device further comprises:

a memory organized in "q" pages of n-bit words;

a plurality of first terminals, connected to said first access means, for the interconnection of said serial digital signals;

q switching circuits interconnecting said plurality of first terminals and said memory;

a plurality of second terminals for the interconnection of parallel data signals;

q bit-selector circuits interconnecting said plurality of second terminals and the page data outputs of said memory; and wherein said at least one time-division switching device is an outgoing time-division switching device, the serial signal terminals thereof being connected to said second access means, characterized by:

means for connecting the inputs of said q switching circuits to said memory via said q-bit selector circuits;

means for connecting said plurality of second terminals to the data outputs of the q pages of said memory, said read-address circuit comprising:

a first counter having a signal input connected to the output of the local system clock, and counter state outputs connected to the control terminals of said q switching circuits and also to the read-address code inputs of the various pages of said memory;

a second counter having a count signal input connected to the overflow output of said first counter and a plurality of counter state outputs connected to said q bit selector circuits for controlling the same;

a third counter having a count signal input connected to the overflow output of said second counter, and counter state outputs connected to different read-address code inputs of the various pages than said first counter, said write-address circuit comprising:

means for connecting the least significant code output of said write-address circuit to one of the q pages of said memory to enable the same; and means for connecting the most significant code output of said write-address circuit to the write-address code inputs of the various pages of said memory, said read/write control circuit producing a signal which enables all pages of the memory in the read mode.

* * * * *